United States Patent [19]

Meyers

[11] Patent Number: 5,558,576
[45] Date of Patent: Sep. 24, 1996

[54] AIR DEFLECTOR PANEL INSERT FOR USE IN AXIAL FLOW TYPE COMBINES

[76] Inventor: Philip E. Meyers, P.O. Box 65, Frontier, Saskatchewan, Canada, S0N 0W0

[21] Appl. No.: 462,112

[22] Filed: Jun. 5, 1995

[30] Foreign Application Priority Data

Feb. 10, 1995 [CA] Canada ................... 2142218

[51] Int. Cl.$^6$ ..................... A01F 12/44
[52] U.S. Cl. ............... 460/99; 460/100; 56/12.8
[58] Field of Search ............. 460/100, 99, 101, 460/102, 97, 902, 903; 56/13.3, 12.8

[56] References Cited

U.S. PATENT DOCUMENTS

| 3,664,349 | 5/1972 | Quick ........................ 460/99 |
| 4,244,380 | 1/1981 | DePauw et al. . |
| 4,303,079 | 12/1981 | Claas et al. ............... 460/99 |
| 4,307,732 | 12/1981 | De Busscher et al. . |
| 4,353,376 | 10/1982 | Schuler . |
| 4,465,082 | 8/1984 | Strubbe . |
| 4,863,415 | 9/1989 | Carnewal et al. ........... 460/101 |

FOREIGN PATENT DOCUMENTS

| 595164 | 3/1960 | Canada . |
| 618054 | 4/1961 | Canada . |
| 1162817 | 2/1984 | Canada . |
| 1198646 | 12/1985 | Canada . |
| 2007203 | 9/1990 | Canada . |
| 6197622 | 7/1994 | Japan ........................ 460/99 |

Primary Examiner—Terry Lee Melius
Attorney, Agent, or Firm—Sand & Sebolt

[57] ABSTRACT

An air flow deflector panel for insertion into existing combines of the axial flow type without modification to the combines for changing the direction of air flow from the cleaning fan to the sieve section. The air flow deflector panel includes a plate having mounting brackets for attachment to the existing structure of the combine for holding the plate which extends across the separation chamber behind the outlet of the throat of the cleaning fan. The plate includes an angled portion for directing a required portion of the air beneath the sieves past the front portion thereof. The air flow deflector panel accomplishes more effectively separation of the straw and chaff from the grain being collected below the sieve section than is currently possible with certain models of combines of the axial flow type and further eliminates the use of a higher air flow which can in any event result in a portion of the grain being expelled with the debris.

14 Claims, 7 Drawing Sheets

AIR DEFLECTOR PANEL INSERT FOR USE IN AXIAL FLOW TYPE COMBINES

FIELD OF THE INVENTION

This invention relates to an air deflector panel for use in axial flow type combines, and more particularly, to an air deflector panel which may be installed as an insert adjacent the cleaning fan air discharge throat of existing combines to enhance the grain cleaning function of the combine.

DESCRIPTION OF PRIOR ART

During the last couple of decades a number of combine manufacturers have commenced producing combines of the axial flow type, such as the type generally shown in U.S. Pat. No. 4,244,380, Jan. 13, 1981, DePauw et. al. assigned to International Harvester Company. Models sold under the trade-mark Case II by J. I. Case as the 1400/1600 series and 1644/1666/1688 series have gained wide acceptance due to a number of design features. Generally combines of the axial flow type provide more effective combining in coarser crops, and particularly corn harvesting. However, in cereal grain crops such as wheat and barley, where there is a high ratio of straw and chaff which is much finer then corn stalks, cobs, leaves and husks, there exists a less efficient separation of the grain in the sieve section of the above models of combines. While older combines are known which have adjustable baffles in the outlet throat of the cleaning fan of the combine, the above models include no baffles. While the quantity of air flow from the fan and the angles of the sieves are both adjustable in these models, an increase in the air flow sufficient to remove more chaff and straw from the sieves results in a higher percentage of the finer grain being blown out of the combine with the debris. In such crops, depending on a number of conditions, such as the climatic conditions experienced during the grain growing season, the amount of straw and chaff in relation to the amount of grain varies and this adds to the problem of obtaining a setting of the air flow and sieves for good separating conditions.

SUMMARY OF THE INVENTION

It is an object of this invention to provide a panel in the form of an insert for installing in already existing combines to achieve more effective separation of straw and chaff from the grain.

Research in the structure of existing combines of the type described above has shown that due to the direction of flow of air from the throat of the cleaning fan in the combine, a major portion of the air passes through the front portion of the sieves. The existing air flow pattern is in fact directed to about the forward 20% of the areas of the sieves.

According to the present invention there is provided an air deflector panel for insertion into existing combines of the axial flow type having sieve elements extending rearwardly from a front portion located behind and slightly above an outlet of a throat of a cleaning fan, a lower edge of the outlet being defined by a raised ridge extending transversely across a separation chamber defined between side walls of the combine. The air deflector panel includes an air directing plate member and mounting members having means for attachment of the air deflector panel to existing structure of the combine and supporting the plate in a position spaced above the ridge and projecting rearwardly thereof. In the supported position the plate deflects a portion of the air being expelled from the throat in a less upwardly direction so that the portion of expelled air passes rearwardly before flowing upwardly through the sieve elements.

BRIEF DESCRIPTION OF THE DRAWINGS

In the accompanying drawings which show embodiments of the invention, as examples.

DESCRIPTION OF PREFERRED EMBODIMENT

Figure 1:
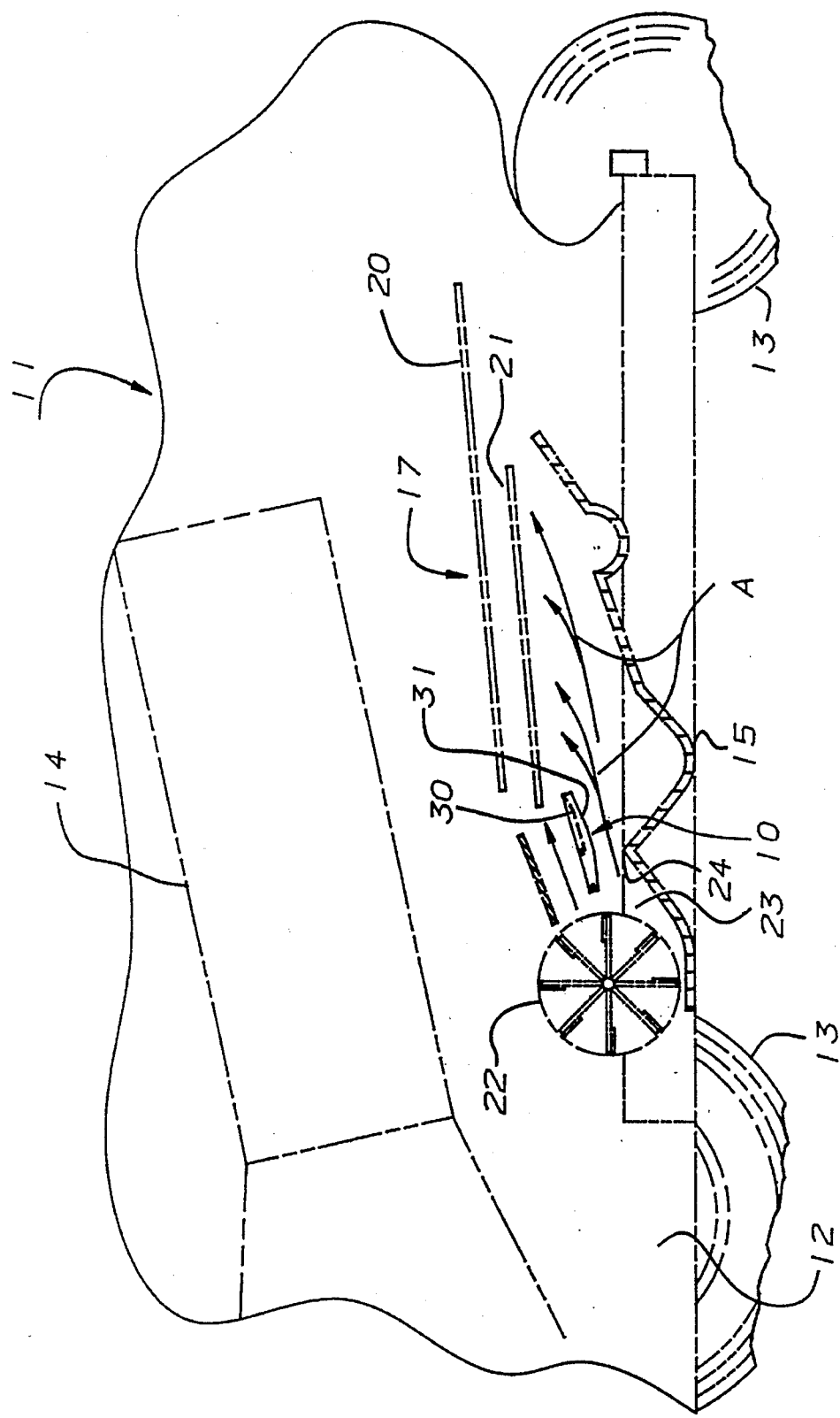
FIG. 1 is a side sectional view of a combine, showing the interior thereof with an air deflector panel of one embodiment of the invention mounted therein.
Figure 2:
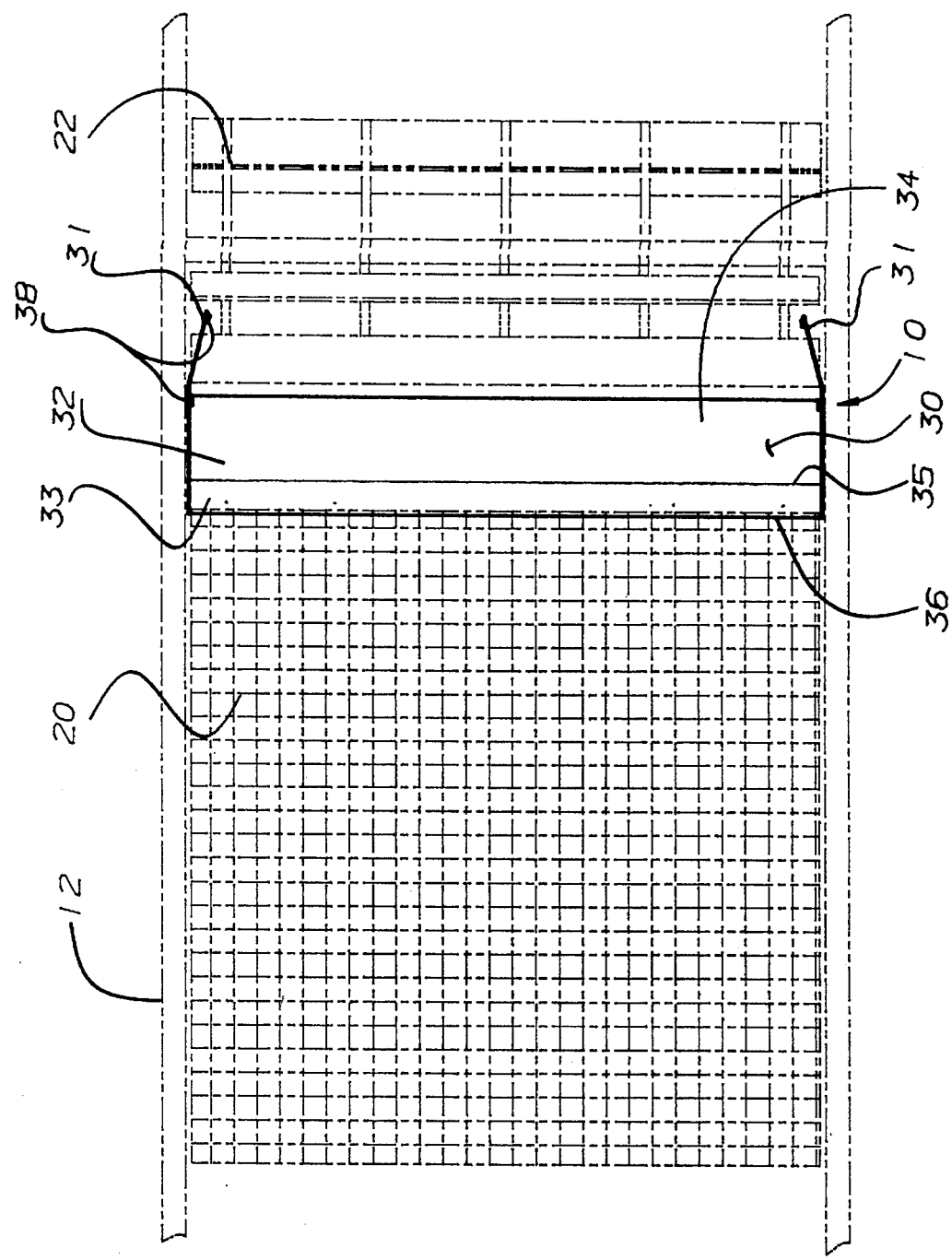
FIG. 2 is a top view of an air fan and sieve section of a combine and wherein the air deflector panel the embodiment of the invention shown in FIG. 1 has been installed.
Figure 3:
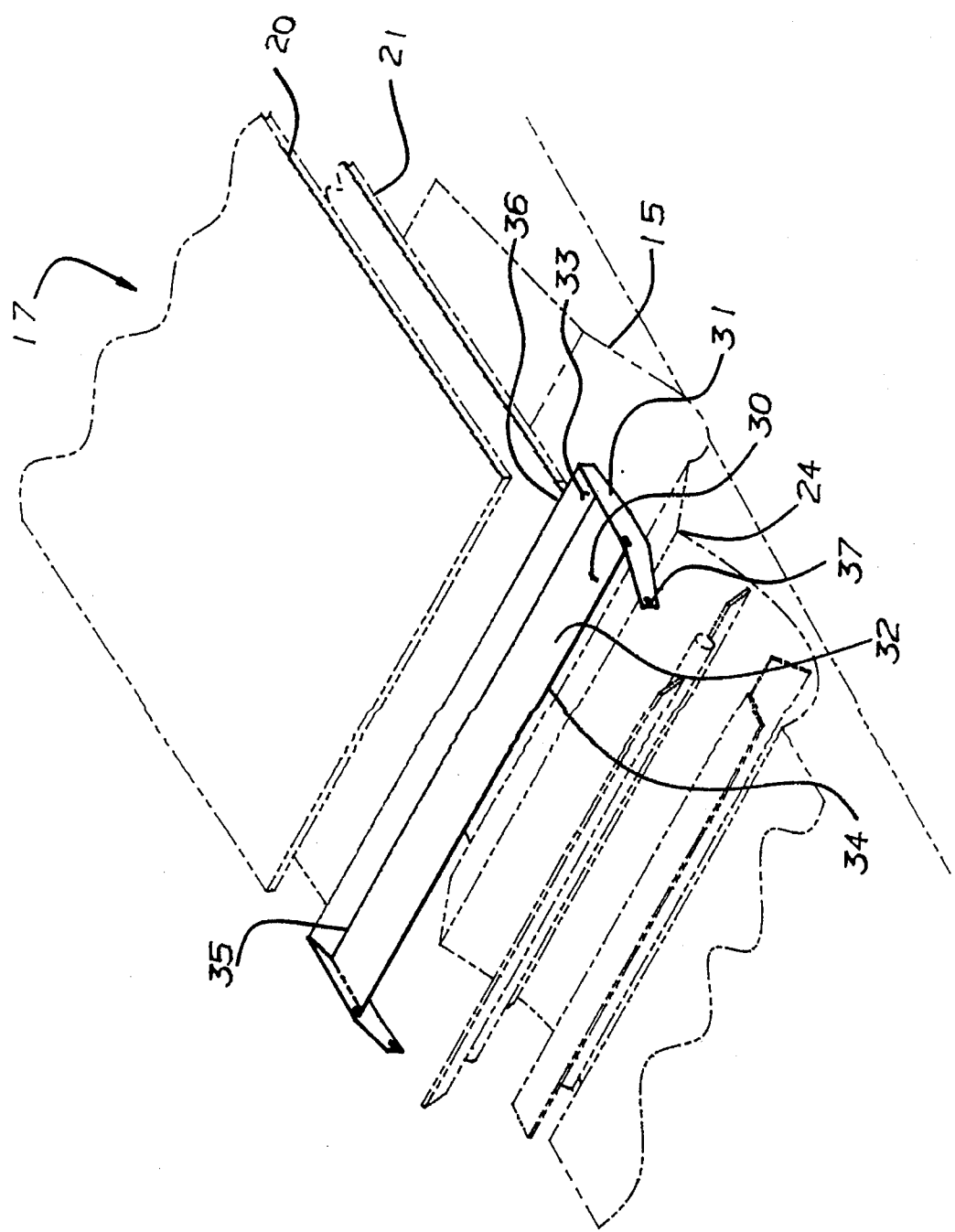
FIG. 3 is a perspective view of the same embodiment of the invention illustrating its mounted position within the combine.
Figure 4:
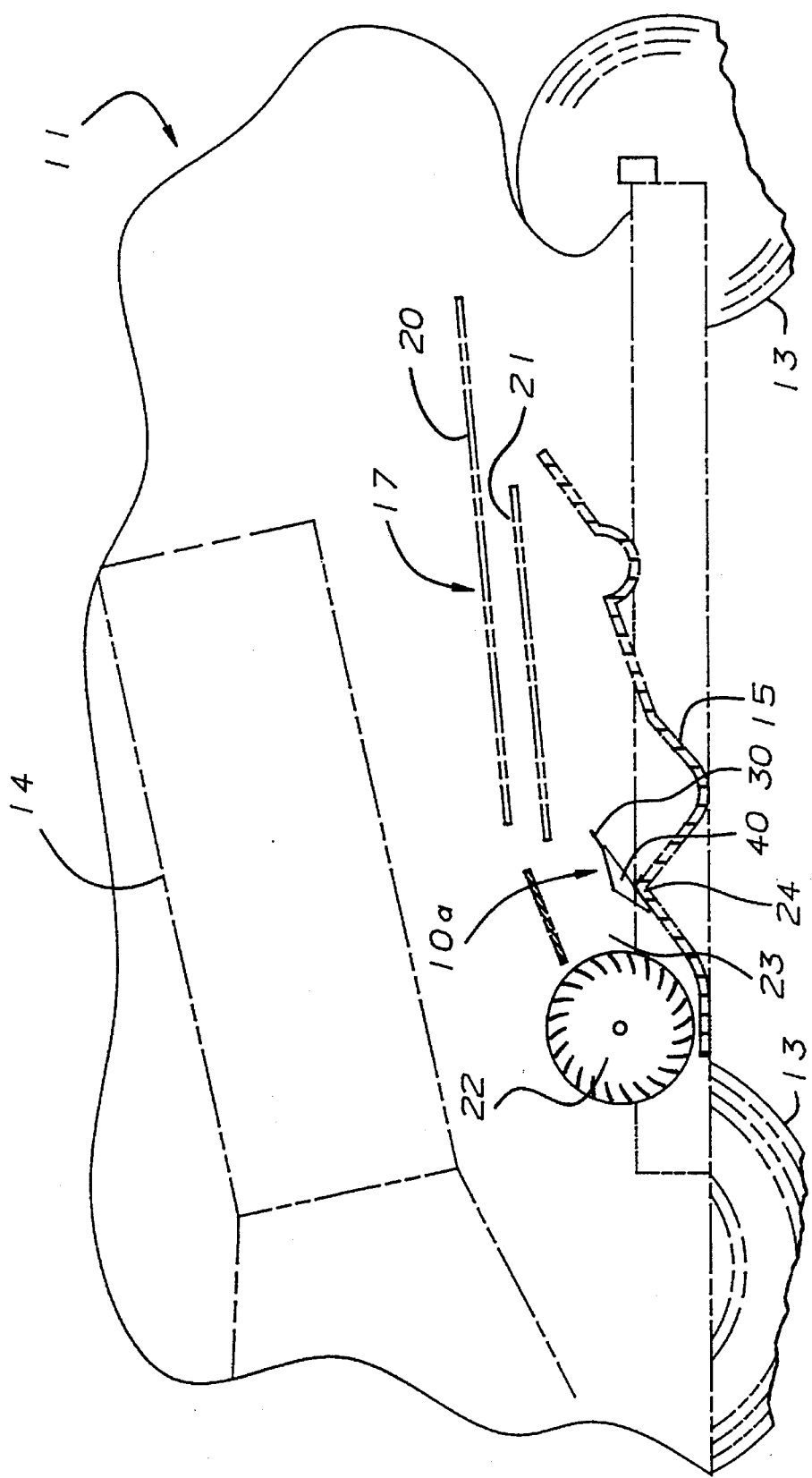
FIG. 4 is a view similar to FIG. 1, but showing another embodiment of the invention.
Figure 5:
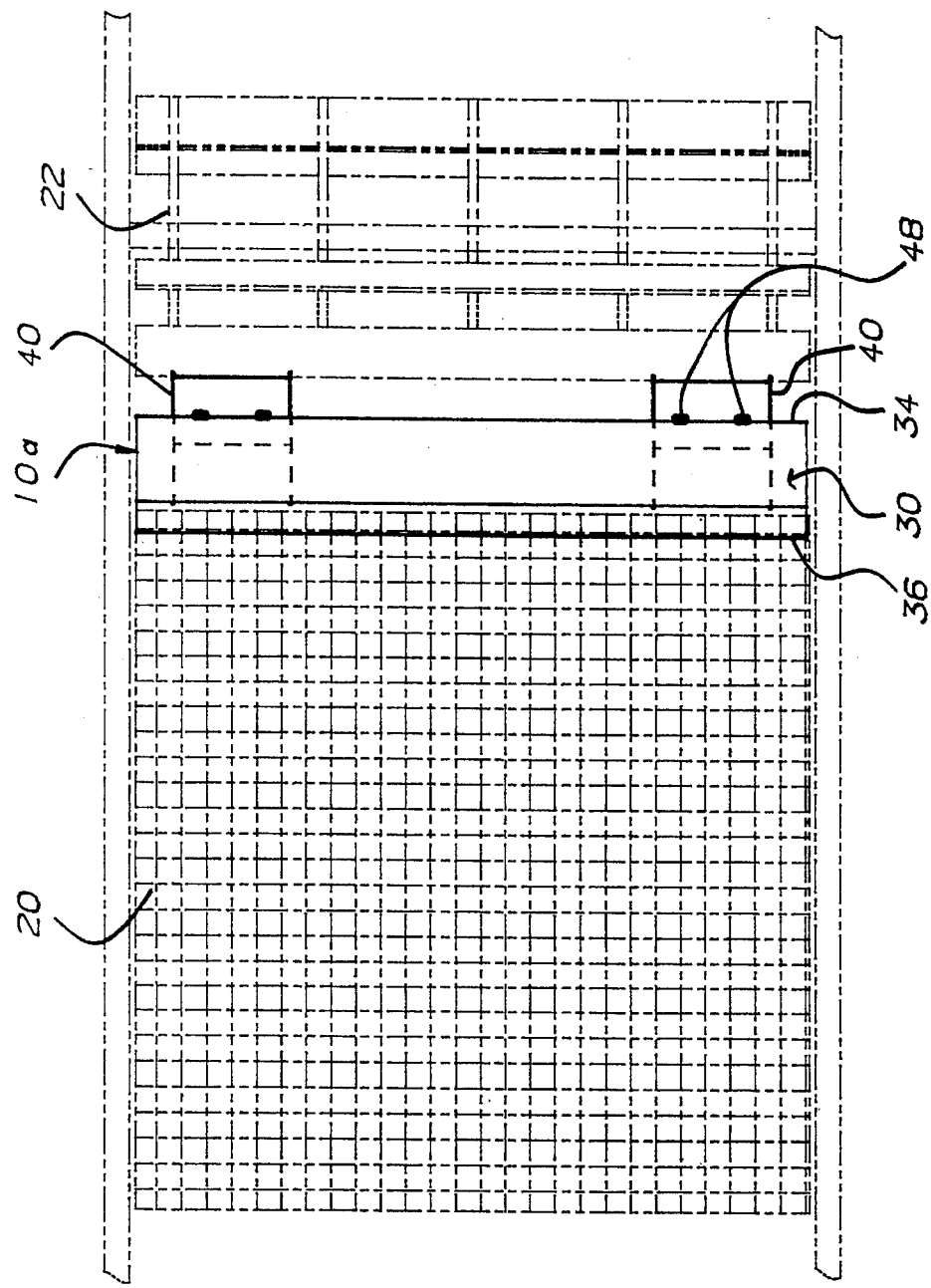
FIG. 5 is a top view, like FIG. 2, showing the embodiment of the invention of FIG. 4.
Figure 6:
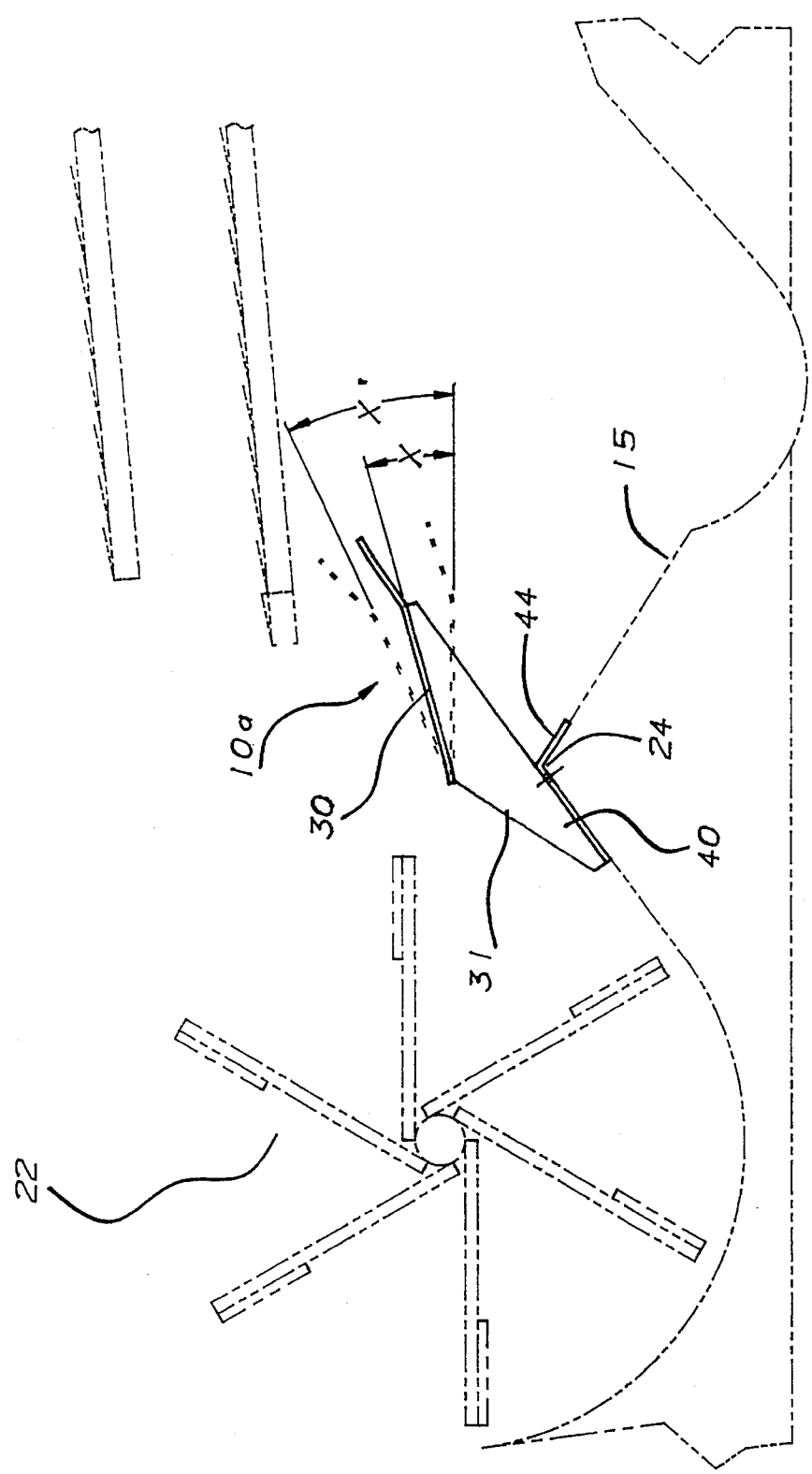
FIG. 6 is a side view which is enlarged relative to FIG. 4 to more clearly indicate the position of the air deflector panel of the invention in relation to the cleaning fan and the sieves of the combine.

In the drawings, reference characters are used to show like elements referred to in the description. In FIGS. 1 to 3, the flow deflector panel of the present invention is shown as 10 mounted in a combine 11 of the type of models Case IH Series 1440/60/80 or Series 1640/60/80 which include a housing 12 carried on ground engaging wheels 13. Within an upper part of the housing there is provided an axial flow separating and threshing apparatus 14. Located at the bottom of the housing is a floor or bottom wall 15 on which the grain is collected and carried away by augers (not shown). The grain and some debris, which includes chaff and straw, falls from the apparatus 14 and is deposited on a sieve means 17, which includes an upper sieve 20 and a lower sieve 21. The two sieves are disposed substantially parallel to each other and slant upwardly slightly towards the rear. The sieves 20 and 21 are agitated by drive means (not shown) so as to assist in the grain passing through the sieves to be collected on the bottom wall 15. A separating cleaning fan 22 is provided in front of the sieve means 17 and has a length in the axial direction thereof extending across the width of the housing. The air which is forced out through the throat 23 of the fan 22 is directed up towards the front end of the sieves so that as it flows through the sieve it lifts the lighter debris and blows it towards the straw outlet at the back of the housing 12, thus bringing about the separation of the chaff and straw from the grain.

As previously indicated, when combines of these types are used for combining corn, the separation is very effective. However, with cereal grains, the separation is frequently not complete, and this has been found to be due to the phenomenon of this type of machine, and particularly of the type and shape of the throat of the separating fan to direct a high percentage of the output air toward the front part of the sieves, thus not fully removing the debris which collects towards the rear ends of the sieve. Although the quantity of air flow from the throat can be adjusted to provide a higher flow, this causes grain to be ejected from the sieves with the debris while complete debris removal from the grain is not achieved.

A characteristic of such models of combines which are in use is that the wall which defines the bottom of the throat rises at a rather abrupt angle towards the sieves. It may be noted that this upwardly slanted bottom wall terminates at a high point or transverse ridge 24 which defines the outlet of the throat 23. The ridge 24 of the outlet extends across the width of the separation chamber. It has been found that there is a tendency, as indicated above, for the air being expelled past the ridge 24 at the throat outlet to be forced up through the front part of the sieves and thus not pass up through the sieves more towards the rear where a significant amount of debris collects.

The air deflecting panel 10 of the embodiment of FIGS. 1 to 3 includes a plate member 30 which extends across the housing in the path of flow of air from the throat 23. The plate 30 has mounting brackets 31, which are vertical plate members, attached to opposite ends for affixing the air deflecting panel within the housing. The plate member 30 has a front portion 32 which slopes slightly upwardly in a rearwardly direction and a rear portion 33 formed integrally with the front portion and sloping upwardly at a greater angle toward the rear than the front portion 32. Thus, in the direction of flow of the air rearwardly from the throat outlet the plate 30 has a front edge 34 from which the front portion 32 extends rearwardly and slightly upwardly to a bend line 35 where the front portion 32 integrally joins the front edge of the rear portion 33, the rear portion 33 then extending upwardly at a steeper angle to a rear edge 36 (FIG. 3). As shown the front portion 32 has a greater width between the front edge 34 and the bend line 35 than the rear portion 33 which extends between the bend line 35 and the rear edge 36. The preferred positioning, size and angular disposition of the plate 30 for providing the required air flow will be described in more detail below. When installed, the plate causes the air being expelled from the throat 23 of the cleaning fan 22 to follow the path denoted by the arrows A so that a significant portion of the air flow also passes up through the sieves towards the rear.

As can best be seen in FIG. 3, the mounting brackets are steel plate members which are disposed in parallel vertical planes so that the outside surface thereof engages the inside surfaces of the side walls of the housing. The air deflector panel 10 is thus provided as an insert in an existing combine structure, and in the models described, it can be easily installed without any modification to the existing structure. Openings 37 are provided in the mounting brackets 31 in a position which allows removal of existing bolts 38 in the combine structure so that they can be inserted through the openings and the nuts reapplied to fasten the air deflector panel 10 in its proper location.

Turning now to the embodiment shown in FIGS. 4 to 8, the air deflector panel 10a is substantially the same as that described above except that it is provided with a mounting means specifically designed for mounting in Case IH combines models which have been sold under Series 1644/66/88. The plate 30 of this embodiment and its placement relative to the ridge 24 at the outlet of the throat 23 is in fact the same as that of the earlier embodiment. Due to structural differences within these models, however, the mounting means has been modified so that it can be used as an insert without any modifications to the combine. It may be noted that it does not include end mounting brackets such as those shown at 31,31 of the earlier embodiment.

Figure 8:
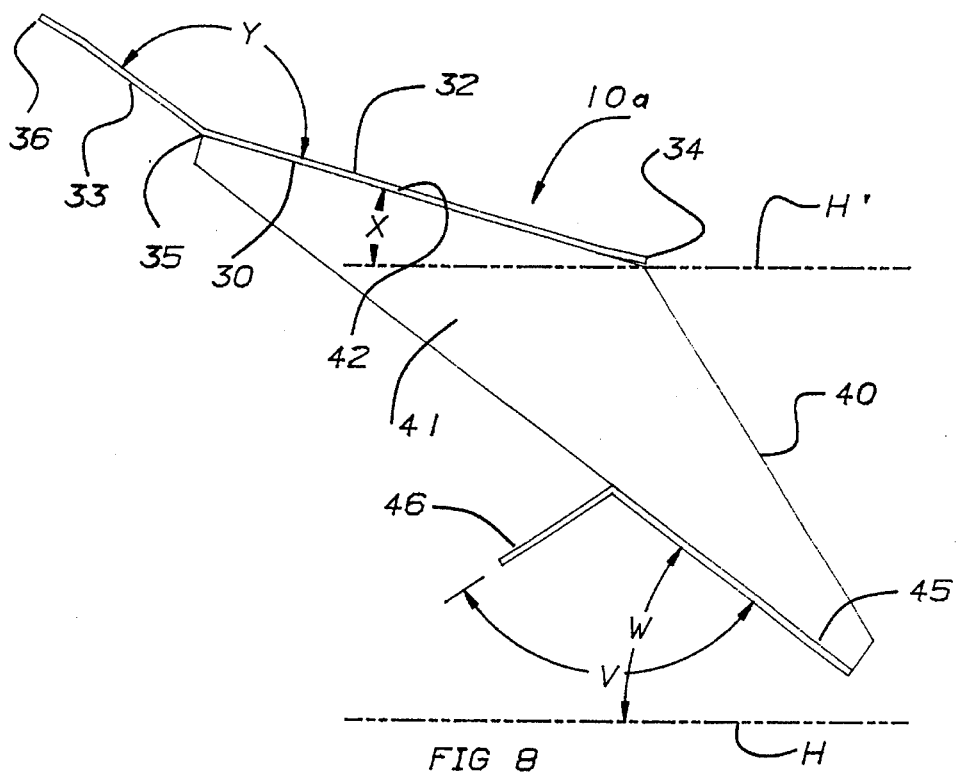
FIG. 8 is a still further enlarged side view of the embodiment of FIG. 4.
Figure 7:
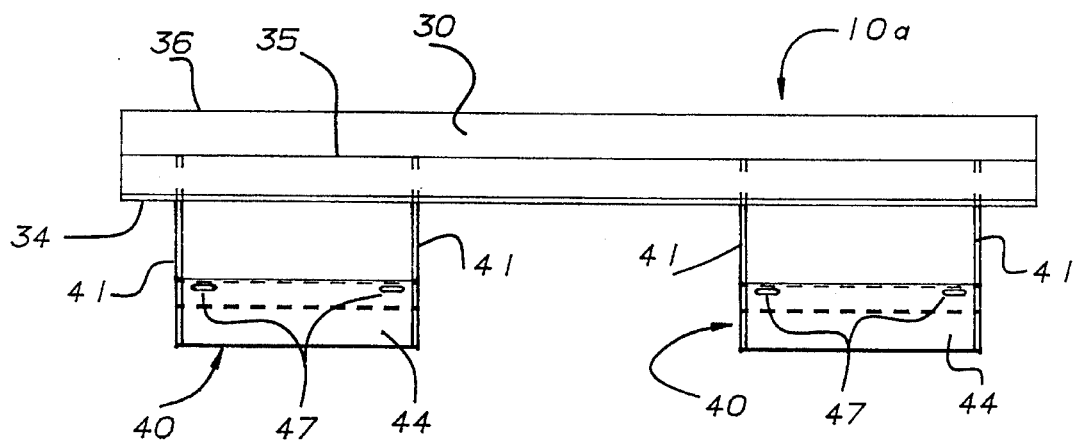
FIG. 7 is an enlarged front view of the embodiment of FIG. 4.

The air deflector panel 10a is mounted on a pair of mounting brackets 40 which are secured to the bottom wall on top of the transverse ridge 24 at the outlet of the throat 23. Each bracket 40 includes a pair of spacer or support plates 41 which are parallel and vertically disposed in a plane extending in the direction of the flow of the air from the outlet of the throat 23 so as to provide substantially no resistance to the air passing towards the sieve means 20. As best seen in FIG. 8 the plates are substantially of triangular shape having a top edge 42 which is affixed to the bottom surface of the front portion 32 of the plate 30. As in the earlier embodiment, the plate 30 extends the full width of the separation chamber and is located between the outlet of the throat 23 and the front ends of the sieves 21 and 22. The rear edge 36 of the plate 30 is spaced below and slightly rearward of the forwardmost edge of the lower sieve 21, with the forward or front edge 34 of the plate 30 being spaced above and slightly forward of the ridge 24. The two pairs of support plates 41 forming part of the mounting brackets 40 support the plate 30 in such a position. Lower edges 43 of each pair of plates 41 are affixed to an attachment member 44 which in cross section has a pair of leg portions 45, 46 so as to form an angular configuration to fit over the ridge 24 of the models concerned. As shown, the angle V between the legs 45 and 46 is approximately 110° to fit over the ridge, and when mounted, the angle W relative to the horizontal line 14 is approximately 37°. The plates 41 are so configured that their top edges 42 are at an angle sloping upwardly towards the rear at an angle X which is approximately 16° relative to the horizontal line H'. The attachment members 44 have openings 47 provided in the leg portions 45 thereof positioned so as to enable attachment to the ridge 24 by bolts 48 which are within the existing structure of the models of the combine for which a deflector panel 10a is designed. Thus, again the installation of the air deflector panel as an insert requires no modification of the combine.

As is apparent from the above, the front portion 32 of the plate 30 slants upward away from its front edge 34 at an angle of about 16 degrees, and this is a preferred angle for both embodiments. However, as represented by the alternative positions shown in FIG. 6, satisfactory results have been found over a range where X' is from about 0° to about 26°. The obtuse angle Y formed between the front portion 32 and the rear portion 33 of the plate 30 is preferable about 110° which means that for the preferred angle value of about 16° for the front portion 32 relative to the horizon, the rear portion is sloped upwardly and rearwardly at an angle of about 36° relative to the horizon.

As indicated above the front edge of the plate 30 is spaced above the top of the ridge 24, this vertical distance being approximately 3½ inches extending up from the ridge, and this edge is disposed about ½ inch forward of the vertical plane containing the ridges. The front portion 32, between its front edge 34 and the bend line 35 has a length of about 7 inches, and this is the portion which is preferably disposed at an angle X sloping upwardly and rearwardly towards the sieve means 20 at an angle of about 16°. The length of the rear portion 33 from the bend line 35 to the rear edge 36, which is preferably disposed at an angle sloping rearwardly and upwardly of about 36°, is about 3 inches.

When installed in the axial flow combines of the above types, the air deflector panel of this invention results in the appropriate amount of air being directed, as indicated by the arrows A, under the sieve means 20 so that it passes upwardly through the sieves throughout their length in the rearward direction, thus more effectively removing the chaff and straw to provide a clean flow of grain onto the bottom wall 15, while preventing the need for a higher flow of air which could otherwise result in a loss of the grain with the debris being discharged.

While two embodiments of the invention have been shown, modifications within the spirit of the invention as defined in the appending claims will be apparent to those skilled in the art.

What I claim is:

1. An air deflector panel for insertion into existing combines of the axial flow type having sieve elements extending rearwardly from a front portion thereof located behind and slightly above an outlet of a throat of a cleaning fan, a lower edge of said outlet being defined by a raised ridge extending transversely across a separation chamber defined between side walls of said combine; said air deflector panel including an air directing plate member and mounting members having means for attachment of said air deflector panel to existing structure of the combine, said mounting means including an attachment member for bolting on said ridge and spacer plates disposed in vertical planes extending in the direction of flow of air from said outlet, said vertical plates being affixed between said plate and said attachment members for supporting said plate above said ridge and projecting rearwardly thereof whereby said plate deflects a portion of air being expelled from the outlet of said throat under said plate and in a less upward direction so that said portion of expelled air passes rearwardly of said front portion before flowing upwardly through said sieve elements.

2. An air deflector panel as defined in claim 1, wherein said plate includes a front portion and a rear portion, said front portion having a front edge facing the air flow from said outlet.

3. An air flow deflector as defined in claim 2, wherein said front portion extends rearwardly and slightly upwardly from said front edge to a junction with said rear portion, said rear portion extending rearwardly and upwardly at a steeper angle to a rear edge of said plate.

4. An air flow deflector as defined in claim 3, wherein said front portion has greater length between said front edge and said junction line than the length of said rear portion between said junction line and said rear edge.

5. An air flow deflector as defined in claim 4, wherein said front and rear portions are formed as a unitary plate and wherein said junction line is a bend line.

6. An air flow deflector as defined in claim 5, wherein said length of said front portion in the direction of air flow is about 7 inches and the length of said rear portion is about 3 inches.

7. An air flow deflector as defined in claim 4, wherein said front edge is disposed slightly forward of said ridge and is disposed about 3½ inches thereabove.

8. An air flow deflector as defined in claim 4, wherein said front portion is disposed at an angle about between 0° and about 26° relative to a horizontal plane.

9. An air flow deflector as defined in claim 8, wherein said rear portion is disposed at about 160° relative to said front portion.

10. An air flow deflector as defined in claim 8, wherein said front portion is disposed at an angle of about 16° relative to a horizontal plane.

11. An air flow deflector as defined in claim 8, wherein said rear portion is defined at an angle of about 36° relative to a horizontal plane.

12. An air deflector panel for insertion into existing combines of the axial flow type having sieve elements extending rearwardly from a front portion thereof located behind and slightly above an outlet of a throat of a cleaning fan, a lower edge of said outlet being defined by a raised ridge extending transversely across a separation chamber defined between side walls of said combine; said air deflector panel including an air directing plate member and mounting members having means for attachment of said air deflector panel to existing structure of the combine, said mounting members including a pair of parallel plates affixed to opposite ends of said plate and having outside surfaces for engagement with side walls of said throat, said pair of parallel plates having openings for receiving existing bolts of said combine for locating said air deflector panel in a position spaced above said ridge and projecting rearwardly thereof, said plate including a front portion and a rear portion, said front portion having a front edge facing the air flow from said outlet and extending rearwardly and slightly upwardly from said front edge to a junction with said rear portion, said rear portion extending rearwardly and upwardly at a steeper angle to a rear edge of said plate, whereby said plate deflects a portion of air being expelled from the outlet of said throat in a less upward direction so that said portion of expelled air passes rearwardly of said front portion before flowing upwardly through said sieve elements.

13. An air flow deflector as defined in claim 12, wherein said front portion is disposed at an angle of about 16° relative to a horizontal plane, and said rear portion is defined at an angle of about 36° relative to a horizontal plane.

14. An air flow deflector as defined in claim 13, wherein said length of said front portion in the direction of air flow is about 7 inches and the length of said rear portion is about 3 inches.

\* \* \* \* \*